United States Patent
Jeong

(12)
(10) Patent No.: US 6,178,310 B1
(45) Date of Patent: Jan. 23, 2001

(54) TRANSMITTING AND RECEIVING ANTENNA VOLTAGE STANDING WAVE RATIOS MEASURING CIRCUIT OF BASE STATION IN MOBILE COMMUNICATION SYSTEM

(75) Inventor: Il Yong Jeong, Kyungki-do (KR)

(73) Assignee: LG Information & Communications, Ltd., Seoul (KR)

( * ) Notice: Under 35 U.S.C. 154(b), the term of this patent shall be extended for 0 days.

(21) Appl. No.: 08/998,773

(22) Filed: Dec. 29, 1997

(30) Foreign Application Priority Data

Dec. 30, 1996 (KR) .................................................. 96-77618

(51) Int. Cl.[7] ..................................................... H04B 1/00
(52) U.S. Cl. ....................... 455/67.1; 455/121; 455/129; 455/115; 455/226.1
(58) Field of Search ..................................... 455/115, 129, 455/122, 123, 124, 125, 423, 67.1, 226.1, 425

(56) References Cited

U.S. PATENT DOCUMENTS

| | | | |
|---|---|---|---|
| 5,225,847 | * | 7/1993 | Roberts et al. ...................... 455/123 |
| 5,408,690 | * | 4/1995 | Ishikawa et al. ..................... 455/115 |
| 5,564,086 | * | 10/1996 | Cygan et al. ......................... 455/126 |

* cited by examiner

Primary Examiner—Thanh Cong Le
Assistant Examiner—Darnell R. Armstrong
(74) Attorney, Agent, or Firm—Fleshner & Kim, LLP

(57) ABSTRACT

A transmitting and receiving antenna VSWRs (voltage standing wave ratio) measuring circuit of a base station in a mobile communication system comprises: transmitting and receiving antennas for transmitting and receiving a radio frequency signal of a predetermined frequency band in a mobile communication system; transmitting antenna VSWR measuring means for variable-attenuating and detecting a transmitting signal received from the transmitting antenna and sending a transmitting signal strength to a measuring controller whereby to measure transmitting power and reflected power; and receiving antenna VSWR measuring means for variable-attenuating and detecting a receiving signal received from the transmitting antenna and sending a receiving signal strength to a measuring controller whereby to measure receiving power and reflected power.

11 Claims, 5 Drawing Sheets

TRANSMITTING AND RECEIVING ANTENNA VOLTAGE STANDING WAVE RATIOS MEASURING CIRCUIT OF BASE STATION IN MOBILE COMMUNICATION SYSTEM

BACKGROUND OF THE INVENTION

1. Field of the Invention

The present invention relates to a mobile communication system, and, particularly, to a circuit for measuring voltage standing wave ratios (VSWR) of transmitting and receiving antennas in a base station.

2. Discussion of Related Art

VSWR of a transmitting/receiving antenna of a base station indicates that the ratio of the maximum value and minimum value of a standing wave is 1 in matching state, the standing wave being generated by interference of an incident wave and reflected wave when connecting a load impedance in a transmission line. If the standing wave does not equal to a characteristic impedance in a limited transmission line, some of the incident waves are reflected thereby to generate the reflected waves. The VSWR influences the performance of the transmitting/receiving antenna of the base station. Therefore, it is necessary to accurately measure the VSWR and implement the matching state.

FIGS. 1 and 2 are block diagrams respectively showing transmitting and receiving antenna VSWR measuring circuits of the base station. The forward path indicates a path through which signals are transmitted from the base station to the antenna. The reverse path indicates a path through which signals are transmitted from the antenna to the base station.

As shown in FIG. 1, the transmitting antenna VSWR measuring circuit includes: variable attenuators 12 and 15 coupled to a directional coupler 2 located next to the transmitting antenna 3 for attenuating radio frequency signals; diode detectors 13 and 16 respectively coupled to the variable attenuators 12 and 15 for converting the attenuated radio frequency signals into direct voltage; and voltage comparators 14 and 17 respectively connecting the diode detectors 13 and 16 to a measuring controller (not shown in the drawings) for comparing the converted direct voltage from the diode detectors 13 and 16 with threshold voltage and outputting the results of comparison to the measuring controller.

The following description relates to transmitting power and reflection power measuring procedures of the transmitting antenna VSWR measuring circuit of the base station in the conventional mobile communication system.

For the transmitting antenna transmitting power measuring procedure, the radio frequency signal which is received by the transmitting antenna 3 and passes the forward path or the directional coupler 2 is converted into the direct voltage by the diode detector 13 before being input to the voltage comparator 14. The measuring controller controls analog working voltage of the variable attenuator 12 and detects the analog working voltage of the variable attenuator 12 when the output of the voltage comparator 14 is "HIGH" thereby to measure the transmitting power.

For the transmitting antenna reflection power measuring procedure, the radio frequency signal which is received by the transmitting antenna 3 and passes the reverse path of the directional coupler 2 is converted into the direct voltage by the diode detector 16 before being input to the voltage comparator 17. The measuring controller controls analog working voltage of the variable attenuator 15 and detects the analog working voltage of the variable attenuator 15 when the output of the voltage comparator 17 is "HIGH" thereby to measure the reflection power. At this time, the VSWR of the transmitting antenna can be obtained using the measured transmitting power and reflection power.

As shown in FIG. 2, the receiving antenna VSWR measuring circuit 31 of the base station in the conventional mobile communication system includes: an amplifier 32 coupled to a directional coupler 22 located next to the receiving antenna 23 for amplifying a radio frequency signal, a local oscillator 33 coupled to the amplifier 32 for generating a signal of a predetermined frequency band and applying it to the amplifier 32; a frequency mixer 34 for down-converting the radio frequency signal from the directional coupler 22 into an intermediate frequency (IF) signal; a local oscillator 36 coupled to the frequency mixer 34 for generating a signal of a predetermined frequency band and applying it to the frequency mixer 34; and a receiving signal strength indicator 35 connecting the frequency mixer 34 to the measuring controller (not shown in the drawings) for converting the IF signal from the frequency mixer 34 into the direct voltage and outputting the result of conversion to the measuring controller.

The following description relates to receiving power and reflection power measuring procedures of the receiving antenna VSWR measuring circuit of the base station in the conventional mobile communication system.

For the receiving antenna receiving power measuring procedure, the radio frequency signal which is received by the receiving antenna 23 and passes the forward path of the directional coupler 22 is down-converted into the IF by the frequency mixer 14 before being input to the receiving signal strength indicator 35. The receiving signal strength indicator 35 outputs the strength of the receiving signal converted into analog voltage to the measuring controller which measures the receiving power from the analog voltage.

For the receiving antenna reflection power measuring procedure, the signal which is sent from the local oscillator 33 via the directional coupler 22 is reflected by the receiving antenna 23 and input to the frequency mixer 34 after passing through the reverse path of the directional coupler 22. The reflected signal is down-converted into the IF signal by the frequency mixer 34 and then converted into the analog voltage by the receiving signal strength indicator 35, before being sent to the measuring controller. The measuring controller measures the reflection power from the analog voltage applied by the receiving signal strength indicator 35. Therefore, the VSWR of the receiving antenna can be obtained using the measured receiving power and reflection power.

According to the transmitting and receiving antenna VSWR measuring circuits of the base station in the conventional mobile communication system, however, the transmitting power and receiving power of each frequency band cannot be measured in a multi-frequency allocation system, and the transmitting and receiving antenna VSWRs cannot be accurately measured when a noise signal exists in an adjacent frequency band.

SUMMARY OF THE INVENTION

Accordingly, the present invention is directed to a transmitting and receiving antenna VSWRs measuring circuit of a base station of a mobile communication system that substantially obviates one or more of the limitations and disadvantages of the related art.

An object of the present invention is to provide a transmitting and receiving antenna VSWRs measuring circuit of a base station in a mobile communication system, the circuit being implemented on a single board to measure transmitting and receiving antenna VSWRs of each frequency without influence of a noise signal in an adjacent frequency band.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a transmitting and receiving antenna VSWRs measuring circuit of a base station in a mobile communication system comprises: transmitting and receiving antennas for transmitting and receiving a radio frequency signal of a predetermined frequency band in a mobile communication system; transmitting antenna VSWR measuring means for variable attenuating and detecting a transmitting signal received from the transmitting antenna and sending a transmitting signal strength to a measuring controller whereby to measure transmitting power and reflected power; and receiving antenna VSWR measuring means for variable-attenuating and detecting a receiving signal received from the transmitting antenna and sending a receiving signal strength to a measuring controller whereby to measure receiving power and reflected power.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

With reference to the attached drawings, a preferred embodiment of the present invention is described below in detail.

Figure 1:
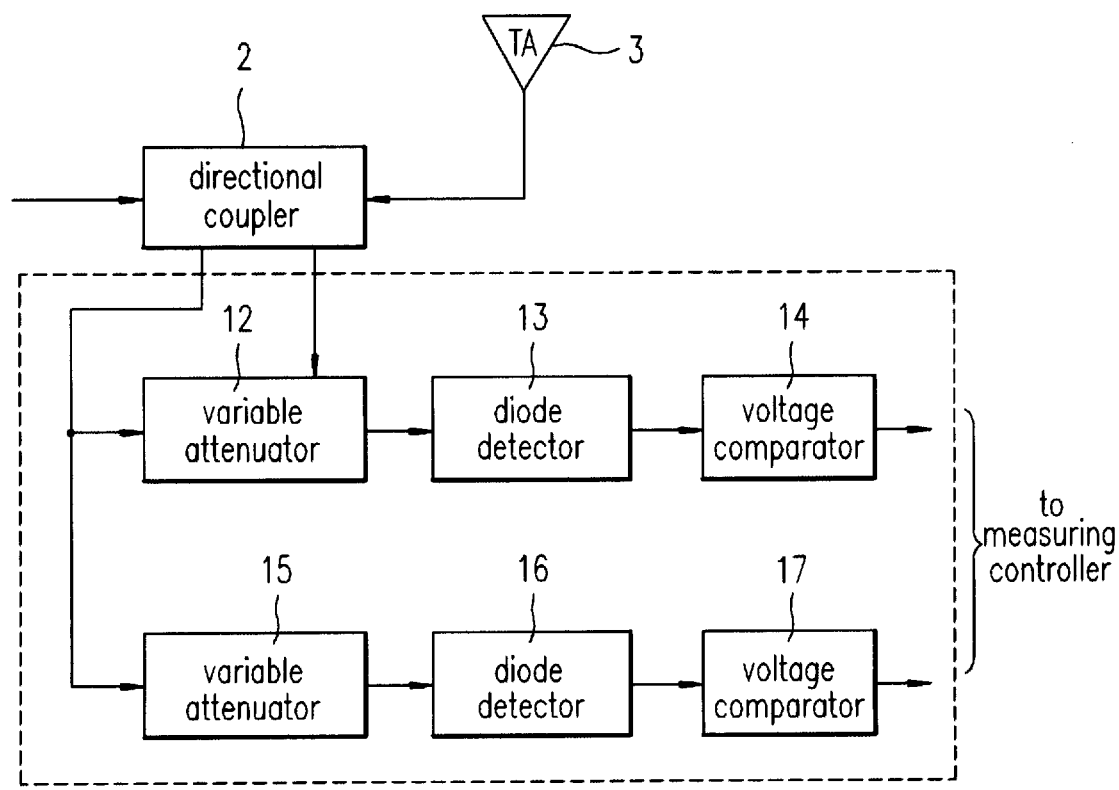
FIG. 1 is a block diagram showing a transmitting antenna VSWR measuring circuit of a base station in the conventional mobile communication system.
Figure 2:
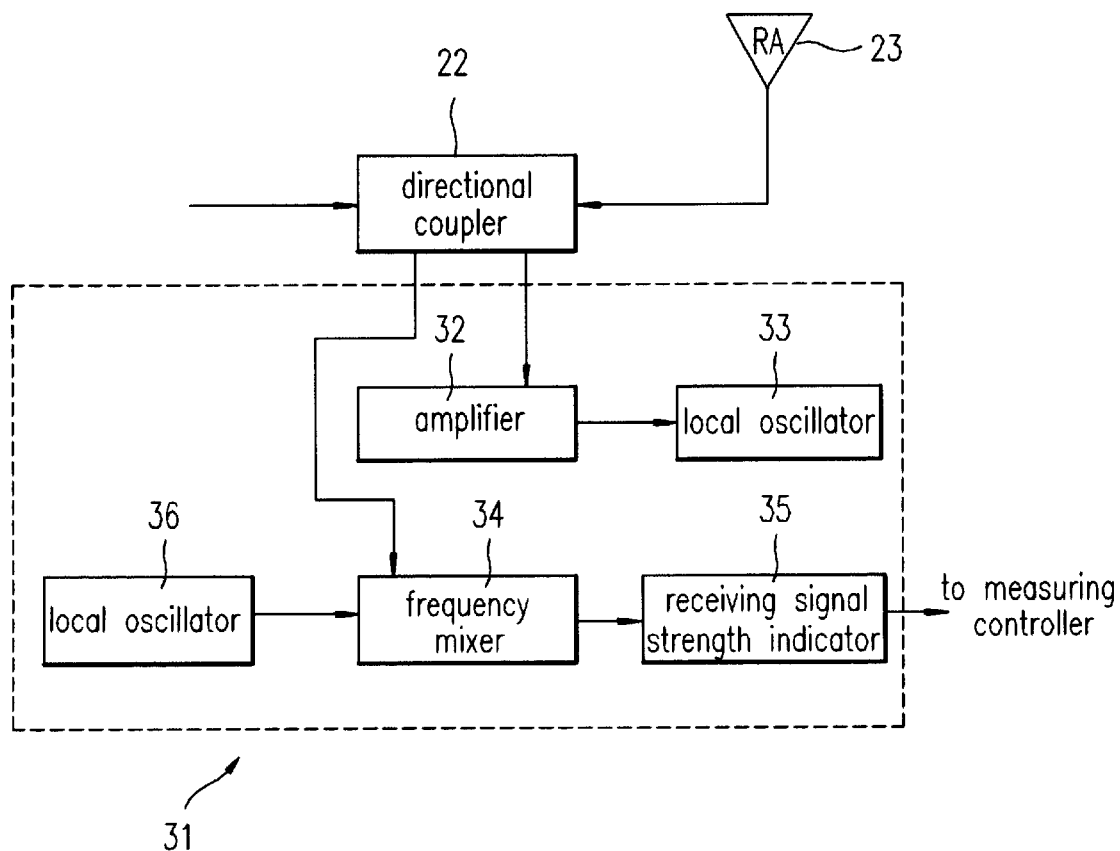
FIG. 2 is a block diagram showing a receiving antenna VSWR measuring circuit of a base station in the conventional mobile communication system.
Figure 3:
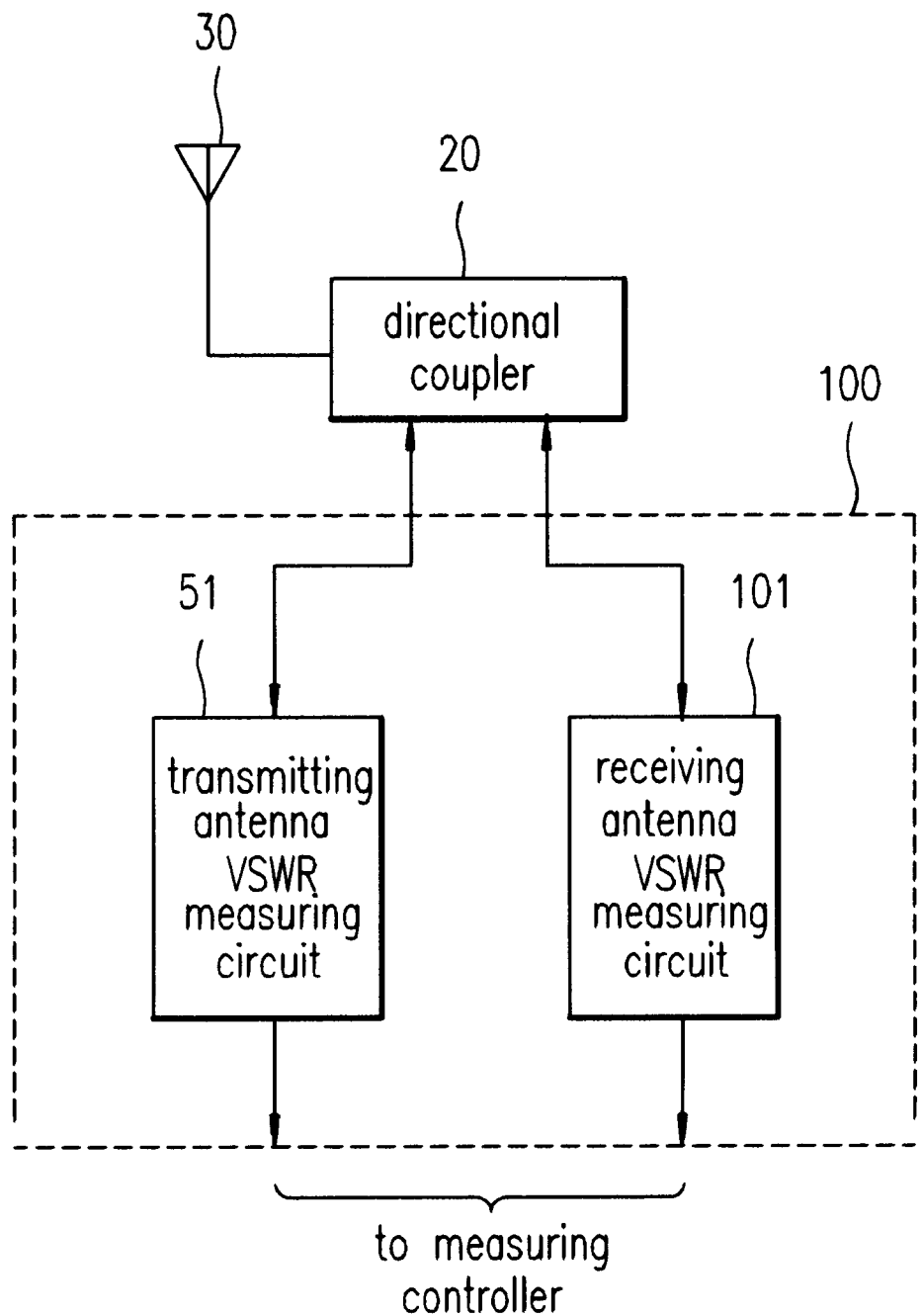
FIG. 3 is a block diagram showing a transmitting and receiving antenna VSWRs measuring circuit of a base station in a mobile communication system according to the present invention.

As shown in FIG. 3, the transmitting and receiving antenna VSWRs measuring circuit according to the present invention includes: a transmitting antenna VSWR measuring circuit 51 for variable-attenuating and detecting transmitting signals and sending a transmitting signal strength to a measuring controller which measures transmitting power and reflection power; and a receiving antenna VSWR measuring circuit 101 for variable-attenuating and detecting receiving signals and sending a receiving signal strength to a measuring controller which measures receiving power and reflection power.

Figure 4:
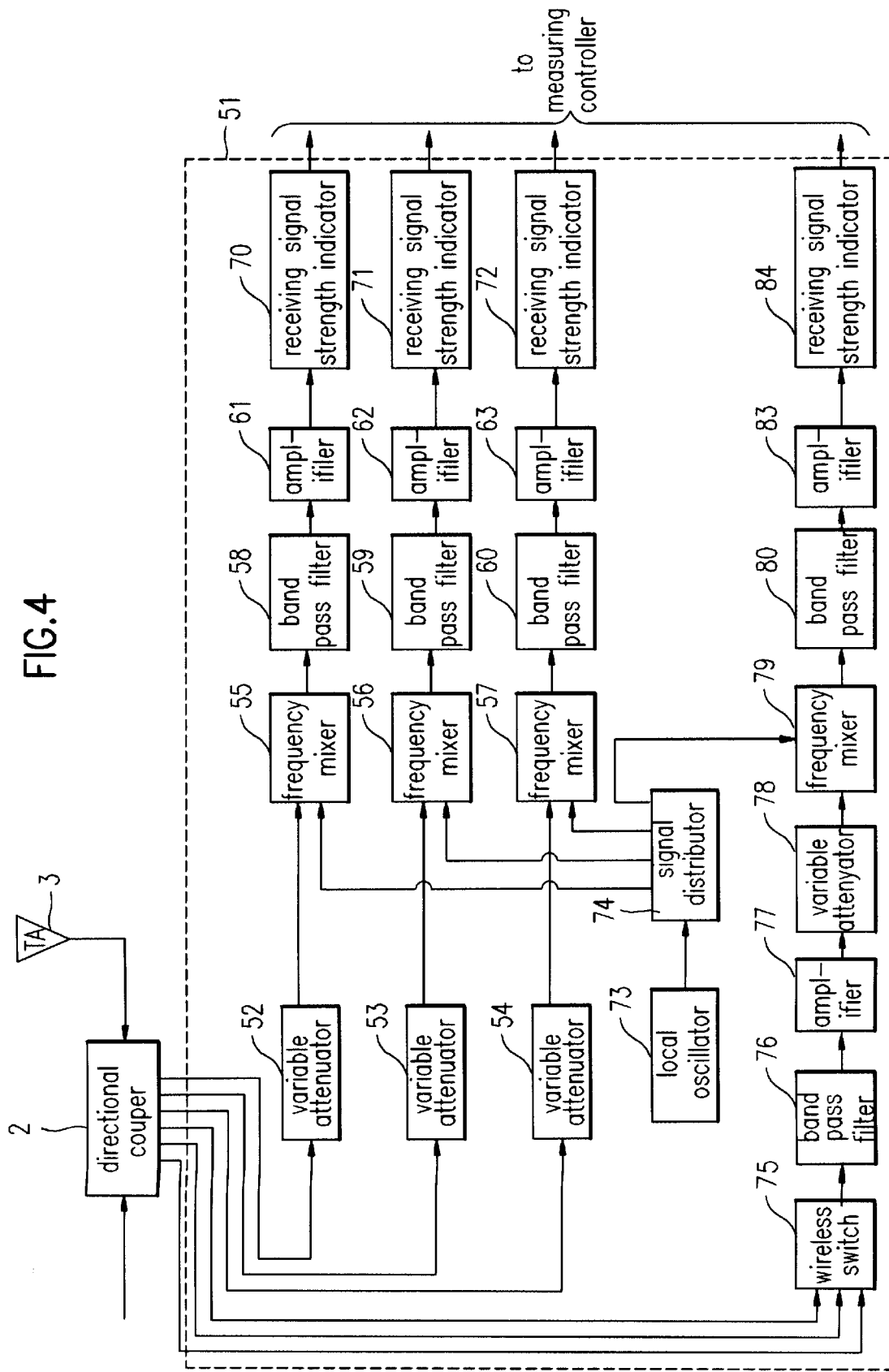
FIG. 4 is a block diagram showing a transmitting antenna VSWR measuring circuit depicted in FIG. 3.

Referring to FIG. 4, the transmitting antenna VSWR measuring circuit 51 includes: variable attenuators 52, 53, and 54 coupled to a directional coupler 2 located next to the transmitting antenna 3 for attenuating a radio frequency signal; frequency mixers 55, 56, and 57 for down-converting the attenuated radio frequency signal into an intermediate frequency (IF) signal; band pass filters 58, 59, and 60 respectively coupled to the frequency mixers 55, 56, and 57 for filtering off signals outside of an IF band; amplifiers 61, 62, and 63 respectively coupled to the band pass filters 58, 59, and 60 for amplifying the IF signal, receiving signal strength indicators 70, 71, and 72 respectively coupled to the amplifiers 61, 62, and 63 for converting the IF signal into the direct voltage and sending the receiving signal strength resulting from the conversion to a measuring controller; a wireless switch 75 coupled to the three output ports of the directional coupler 2 for selecting one of the three ports; a band pass filter 76 coupled to the wireless switch 75 for filtering off signals outside of the radio frequency band; an amplifier 77 coupled to the band pass filter 76 for amplifying the radio frequency signal; a variable attenuator 78 coupled to the amplifier 77 for attenuating the amplified transmitting radio frequency signal; a frequency mixer 79 coupled to the variable attenuator 78 for down converting the radio frequency transmitting signal into the IF signal; a band pass filter 80 coupled to the frequency mixer 79 for filtering off signals outside of the IF band; an amplifier 83 coupled to the band pass filter 80 for amplifying the IF signal; a receiving signal strength indicator 84 coupled to the amplifier 83 for converting the IF signal into the direct voltage and sending the receiving signal strength resulting from the conversion to the measuring controller; a signal distributor 74 for applying a signal generated by a local oscillator 73 to the frequency mixers 55, 56, 57, and 79; and the local oscillator 73 coupled to the signal distributor 74 for generating a predetermined frequency signal.

Figure 5:
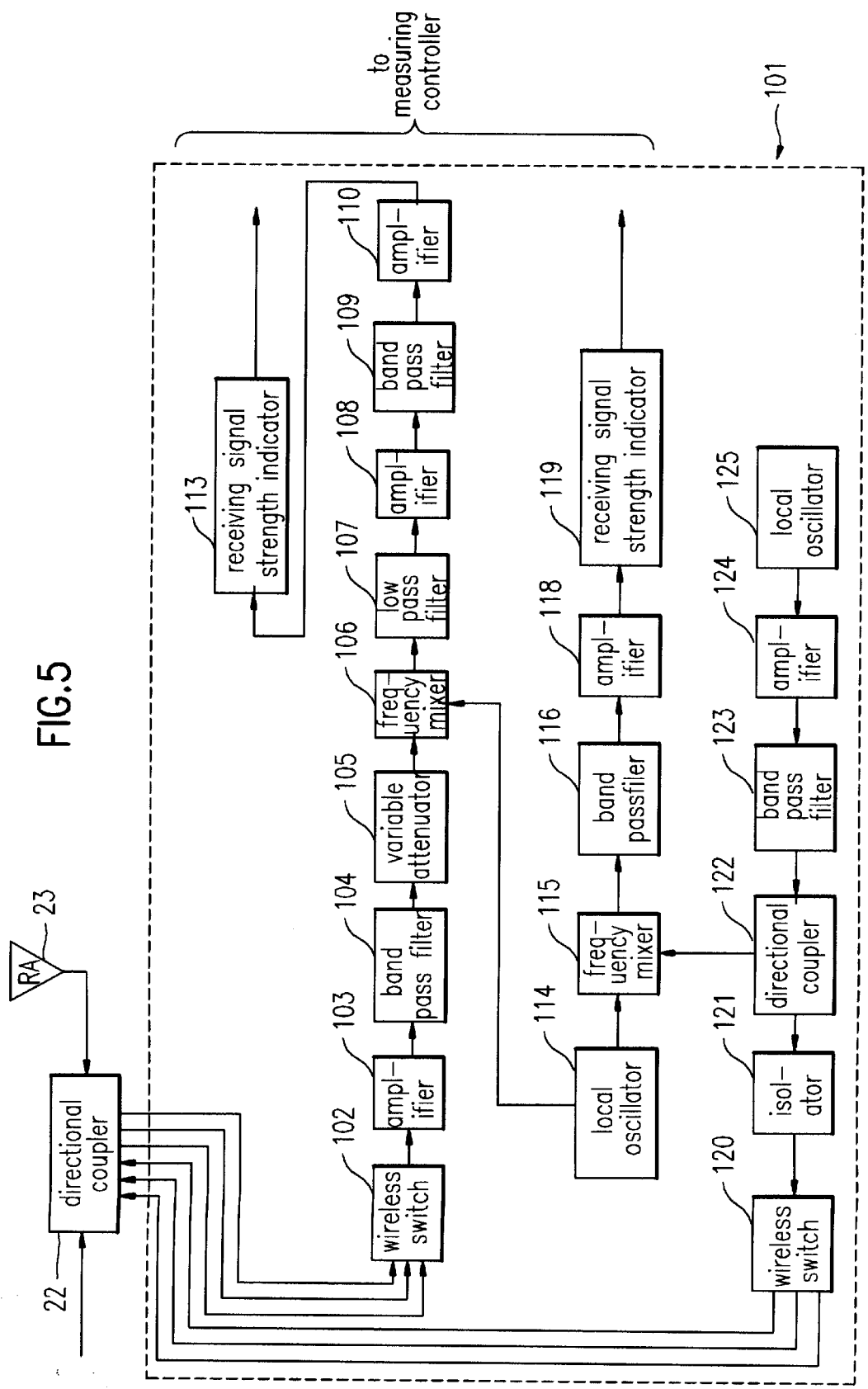
FIG. 5 is a block diagram showing a receiving antenna VSWR measuring circuit depicted in FIG. 3.

As shown in FIG. 5, the receiving antenna VSWR measuring circuit 101 includes: a wireless switch 102 coupled to three output ports of the directional coupler 22 located next to a receiving antenna 23 for selecting one of the three output ports; an amplifier 103 for amplifying the radio frequency signal transmitted from the output port selected by the wireless switch 102; a band pass filter 104 for filtering off elements outside the radio frequency band from the output signal of the amplifier 103; a variable attenuator 105 coupled to the band pass filter 104 for attenuating a receiving radio frequency signal; a frequency mixer 106 coupled to the variable attenuator 105 for down-converting the receiving radio frequency signal into the IF signal; a low pass filter 107 coupled to the frequency mixer 106 for passing only the signal outside of the IF band; an amplifier 108 coupled to the low pass filter 107 for amplifying the IF signal; a band pass filter 109 coupled to the amplifier 108 for filtering off the signal outside of the IF band; an amplifier 110 coupled to the band pass filter 109 for amplifying the signal outside of the IF band; and a receiving signal strength indicator 113 coupled to the amplifier 110 for converting the IF signal into the direct voltage and sending a receiving signal strength resulting from the conversion to the measuring controller.

In addition, the receiving antenna VSWR measuring circuit 101 further includes: a local oscillator 125 for generating a test frequency signal; an amplifier 124 coupled to the local oscillator 125 for amplifying the test signal; a band pass filter 123 coupled to the amplifier 124 for filtering off the signal element outside of the test frequency band; a directional coupler 122 connecting the band pass filter 123 to the frequency mixer 115 for passing the portion of the signal which is transmitted from the band pass filter 123 to the frequency mixer 115; an isolator 121 coupled to the directional coupler 122 for eliminating a reflected wave; a wireless switch 120 coupled to three input ports of the directional coupler 22 for selectively connecting one of three input ports to its output; a local oscillator 114 coupled to the frequency mixers 106 and 115 for generating and applying a predetermined frequency signal to the frequency mixers 106 and 115; a frequency mixer 115 coupled to the local oscillator 114 for down-converting the test frequency signal into the IF signal; a band pass filter 116 coupled to the frequency mixer 115 for filtering off the element outside of the test frequency band; an amplifier 118 coupled to the band pass filter 116 for amplifying the signal of the test frequency band; and a receiving signal strength indicator 119 coupled to the amplifier 118 for converting the test frequency signal into the direct voltage and sending the strength of the test signal resulting from the conversion to the measuring controller.

The VSWR of the transmitting antenna according to the present invention can be measured from transmitting power and reflection power obtained based upon FIG. 4.

For a transmitting power measuring procedure in the transmitting antenna, the radio frequency signal which is received by the transmitting antenna and passes through the forward path of the directional coupler 2 is attenuated by the variable attenuators 52, 53, and 54 and down-converted into the IF signal by the frequency mixers 55, 56, and 57, before passing through the band pass filters 58, 59, and 60.

At this time, it is possible to allow only a frequency signal to be measured of multiple frequency allocation signals to pass through the band pass filters 58, 59, and 60 by controlling a oscillation frequency of the local oscillator 73. The receiving signal strength indicators 70, 71, and 72 send the receiving signal strengths, resulting from the conversion of the signals passing through the band pass filters 58, 59, and 60 into the direct voltage, to the measuring controller. The measuring controller measures the transmitting power of the transmitting antenna from the direct voltage.

For a reflection power measuring procedure in the transmitting antenna, the radio frequency signal is reflected by the transmitting antenna and passes through the reverse path of the directional coupler 22. The radio frequency signal, where noise in the adjacent band is filtered off by the band pass filter 76, is then attenuated by the variable attenuator 78 and down-converted into the IF signal by the frequency mixer 79, before passing through the band pass filter 80.

At this time, it is possible to allow only a frequency signal which will be measured amongst multiple frequency allocation signals to pass though the band pass filter 80 by controlling the oscillation frequency of the local oscillator 73. The receiving signal strength indicator 84 sends the receiving signal strength, resulting from the conversion of the signal passing through the band pass filter 80 into the direct voltage, to the measuring controller. The measuring controller measures the reflection power of the transmitting antenna from the direct voltage which is the result of conversion.

The VSWR of the transmitting antenna can be obtained using the transmitting power and reflection power which are measured through the above procedure.

The VSWR of the receiving antenna according to the present invention can be measured from receiving power and reflection power obtained based upon FIG. 5.

For a reflection power measuring procedure, a signal sent from the local oscillator 125 to the directional coupler 22 is reflected by the receiving antenna before being sent to the band pass filter 104 via the reverse path of the directional coupler 22. The signal passing through the directional coupler 22 is also sent to the frequency mixer 115. The band pass filter 104 filters off the noise of the reflected signal input thereto before sending the reflected signal to the frequency mixer 106. The frequency mixer 106 down-converts the reflected signal input thereto into the IF signal and sends it to the band pass filter 109. At this time, it is possible to allow only a frequency signal to be measured amongst multiple frequency allocation signals to pass through the band pass filter 109 by controlling the oscillation frequency of the local oscillator 114. The receiving signal strength indicator 113 converts the signal passing through the bandpass filter 109 into the direct voltage and sends the result of the conversion to the measuring controller. The measuring controller measures the reflection power from the direct voltage.

For a receiving power measuring procedure, the frequency mixer 115 down-converts the receiving signal into the IF signal and sends it to the band pass filter 116. The band pass filter 116 filters off a signal outside of the IF signal band. At this time, it is possible to allow the band pass filter 116 to pass only a frequency signal to be measured amongst multiple frequency allocation signals by controlling the oscillation frequency of the local oscillator 114. The receiving signal strength indicator 119 converts the signal passing through the band pass filter 116 into the direct voltage and sends the result to the measuring controller. The measuring controller measures the receiving power from the direct voltage.

The VSWR of the receiving antenna can be obtained using the measured receiving power and reflection power.

As illustrated above, in the transmitting antenna VSWR measuring circuit of a base station in a mobile communication system of the present invention, a band pass filter coupled to the rear end of a frequency mixer sorts and passes only the signal of a specified frequency allocation band among the signals input thereto in a forward path, and a variable attenuator coupled to the front end of the frequency mixer eliminates noise of a reflected signal which is received through a reverse path.

In addition, in the transmitting antenna VSWR measuring circuit of the base station in the mobile communication system of the present invention, a band pass filter coupled to the rear end of a frequency mixer sorts and passes only the signal of a specified frequency allocation band among the signals input thereto in a forward path, and other band pass filters respectively coupled to the front and rear end of another frequency mixer eliminate noise of a reflected signal which is received through a reverse path.

The receiving antenna VSWR measuring circuit eliminates noise of a signal reflected by the antenna using a band pass filter coupled to the front end of a frequency mixer and sorts out only the signal of a specified frequency allocation band using a band pass filter coupled to the rear end of the frequency mixer, whereby to measure receiving power values of each frequency in a multi-frequency allocation system.

By connecting three output ports of a directional coupler to a wireless switch, three transmitting and receiving power values and three reflected power values of the transmitting and receiving antennas can be obtained.

As described, a transmitting and receiving antenna VSWRs measuring circuit of a base station in a mobile communication system according the present invention is implemented on a single board and measures transmitting and receiving antenna VSWRs of each frequency without influence of a noise signal, thereby installing the system in the smaller space at the lower cost.

It will be apparent to those skilled in the art that various modifications and variations can be made in a transmitting and receiving antenna VSWRs measuring circuit of a base station in a mobile communication system of the present invention without deviating from the spirit or scope of the invention. Thus, it is intended that the present invention cover the modifications and variations of this invention provided they come within the scope of the appended claims and their equivalents.

What is claimed is:

1. A transmitting and receiving antenna VSWRs (voltage standing wave ratio) measuring circuit of a base station in a mobile communication system, the circuit comprising:

transmitting and receiving antennas for transmitting and receiving a radio frequency signal of a predetermined frequency band in a mobile communication system;

transmitting antenna VSWR measuring means for variable-attenuating and detecting a transmitting signal received from the transmitting antenna and sending a transmitting signal strength to a measuring controller whereby to measure transmitting power and reflected power; and receiving antenna VSWR measuring means for variable-attenuating and detecting a receiving signal received from the receiving antenna and sending a receiving signal strength to a measuring controller whereby to measure receiving power and reflected power.

2. The circuit according to claim 1, wherein the transmitting and receiving antenna VSWR measuring means are implemented in a single board.

3. The circuit according to claim 1, wherein the transmitting antenna VSWR measuring means comprises a directional coupler for outputting the transmitting radio frequency signal of the transmitting antenna through multiple output ports, a transmitting power measuring unit for variable-attenuating the transmitting radio frequency signal from the directional coupler and measuring the transmitting power based upon a predetermined frequency signal, a reflection power measuring unit for making the transmitting radio frequency signal have a predetermined frequency band and measuring the reflection power based upon the said frequency signal, and a frequency signal generator for applying a predetermined frequency signal to the transmitting and reflection power measuring units.

4. The circuit according to claim 3, wherein the transmitting power measuring unit comprises variable attenuators coupled to the directional coupler for attenuating the transmitting radio frequency signal, frequency mixers for down-converting the attenuated transmitting radio frequency signal into an intermediate frequency signal, band pass filters respectively coupled to the frequency mixers for filtering off a signal outside of an intermediate frequency band, amplifiers respectively coupled to the band pass filters for amplifying the intermediate frequency signal, and receiving signal strength indicators respectively coupled to the amplifiers for converting the intermediate frequency signal into direct voltage and sending a transmitting signal strength resulting from the conversion to a measuring controller.

5. The circuit according to claim 3, wherein the reflection power measuring unit comprises a wireless switch coupled to output ports of the directional coupler for selecting one of the output ports, a first band pass filter coupled to the wireless switch for filtering off an element outside of a radio frequency band, a first amplifier coupler to the first band pass filter for amplifying a radio frequency signal, a variable attenuator coupled to the first amplifier for attenuating the amplified transmitting radio frequency signal, a frequency mixer coupled to the variable attenuator for down-converting the transmitting radio frequency signal into an intermediate frequency, a second band pass filter coupled to the frequency mixer for filtering off the portion of a signal outside of the intermediate frequency band, a second amplifier coupled to the second band pass filter for amplifying the intermediate frequency signal, and a receiving signal strength indicator coupled to the second amplifier for converting the intermediate frequency signal into direct voltage and sending a transmitting signal strength resulting from the conversion to a measuring controller.

6. The circuit according to claim 3, wherein the frequency signal generator comprises a local oscillator for generating a predetermined frequency signal and a signal distributor for applying the frequency signal generated by the local oscillator to a plurality of frequency mixers.

7. The circuit according to claim 1, wherein the receiving antenna VSWR measuring means comprises first and second directional couplers for outputting the receiving radio frequency signal of the receiving antenna via a forward or reverse path, a receiving power measuring unit for variable-attenuating the receiving radio frequency signal from the directional coupler and measuring the receiving power based upon a predetermined frequency signal, a reflection power measuring unit for making the receiving radio frequency signal have a predetermined frequency band and measuring the reflection power based upon the frequency signal, and a frequency signal generator for applying a predetermined frequency signal to the forward path of the receiving power measuring unit and the reverse path of the reflection power measuring unit.

8. The circuit according to claim 7, wherein the receiving power measuring unit comprises a first wireless switch coupled to output ports of the directional coupler for selecting one of the output ports, a first amplifier for amplifying the receiving radio frequency signal transmitted through the output port selected by the wireless switch, a first band pass filter for eliminating a portion of the signal output by the amplifier, the portion being outside of a radio frequency band, a variable attenuator coupled to the first band pass filter for attenuating the receiving radio frequency signal, a frequency mixer coupled to the variable attenuator for down-converting the receiving radio frequency signal into an intermediate frequency signal, a low pass filter coupled to the frequency mixer for passing a portion of a signal below an intermediate frequency band, a second amplifier coupled to the low pass filter for amplifying the intermediate frequency signal, a second band pass filter coupled to the second amplifier for filtering off a portion of a signal outside of the intermediate frequency band, a third amplifier coupled to the second band pass filter for amplifying a portion of a signal outside of the intermediate frequency band, and a receiving signal strength indicator coupled to the third amplifier for converting the intermediate frequency signal into direct voltage and sending a receiving signal strength resulting from the conversion to a measuring controller.

9. The circuit according to claim 8, wherein the receiving power measuring unit comprises a first frequency mixer coupled to a first local oscillator for down-converting a test frequency signal into an intermediate frequency signal, a band pass filter coupled to the first frequency mixer for filtering off a portion of a signal outside of a test frequency band, an amplifier coupled to the band pass filter for amplifying a signal of the test frequency band, and a receiving signal strength indicator coupled to the amplifier for converting the test frequency signal into direct voltage and sending a test signal strength resulting from the conversion to a measuring controller.

10. The circuit according to claim 7, wherein the reflection power measuring unit comprises a local oscillator for generating a test frequency signal, an amplifier coupled to the local oscillator for amplifying the test signal, a band pass filter coupled to the amplifier for filtering off a portion of a signal outside of a test frequency band, a first directional coupler coupled to the band pass filter and frequency mixer for passing the portion of the signal from the band pass filter to the frequency mixer, an isolator coupled to the first directional coupler for eliminating a reflected wave, and a wireless switch for coupling one of the output ports of a second directional coupler to the isolator.

11. The circuit according to claim 7, wherein the frequency signal generator comprises a first local oscillator for generating a first test frequency signal and applying it to frequency mixers of the receiving power measuring unit and a second local oscillator for generating a second test frequency signal and applying it to an amplifier of the reflection power measuring unit.

* * * * *